United States Patent [19]
Marrin et al.

[11] Patent Number: 5,875,257
[45] Date of Patent: Feb. 23, 1999

[54] APPARATUS FOR CONTROLLING CONTINUOUS BEHAVIOR THROUGH HAND AND ARM GESTURES

[75] Inventors: Teresa Marrin, Ward Hill; Joseph Paradiso, Medford; Tod Machover, Belmont; Christopher Verplaetse; Margaret Orth, both of Cambridge, all of Mass.

[73] Assignee: Massachusetts Institute of Technology, Cambridge, Mass.

[21] Appl. No.: 813,072

[22] Filed: Mar. 7, 1997

[51] Int. Cl.$^6$ .................................................. G06K 9/00
[52] U.S. Cl. .................................................. 382/107
[58] Field of Search ...................... 345/157, 162, 345/163, 165, 166, 175; 382/107, 187; 340/705, 719, 407.2; 348/675, 687

[56] References Cited

U.S. PATENT DOCUMENTS

| | | | |
|---|---|---|---|
| 4,980,519 | 12/1990 | Mathews | 178/19 |
| 5,296,871 | 3/1994 | Paley | 345/163 |
| 5,517,579 | 5/1996 | Baron et al. | 382/187 |

FOREIGN PATENT DOCUMENTS

| | | |
|---|---|---|
| WO95/21436 | 8/1995 | WIPO . |
| WO96/03737 | 2/1996 | WIPO . |

OTHER PUBLICATIONS

The Radio Baton Progress Report, downloaded from http://cerma-www.stanford.edu/CCRMA/Overview (published 1996).

Morita et al., "A Computer Music System that Follows a Human Conductor," *Computer Magazine* (Jul. 1991) at 44–53.

Sawada et al., "Gesture Analysis Using 3D Acceleration Sensor for Music Control," *Proc. of ICMC* (1995) at 257.

Excerpts from C. Roads, *The Music Machine* (1989) at 9, 191.

Excerpts from C. Roads, *The Computer Music Tutorial* (1996) at 625, 654.

Gordon Kurtenbach et al., "Gestures in Human–Computer Communication," in B. Laurel, ed., *The Art of Human–Computer Interface Design* (1990).

Keane, David, Gino Smecca, and Kevin Wood, "The MIDI Baton II." *Proceedings of the International Computer Music Conference*, 1990. San Francisco: Computer Music Association, 1990, supplemental pages.

*Primary Examiner*—Andrew W. Johns
*Assistant Examiner*—Hieu C. Le
*Attorney, Agent, or Firm*—Cesari and McKenna, LLP

[57] ABSTRACT

Apparatus for continuous sensing of hand and arm gestures comprises hand-held means for continuously sensing at least tempo and emphasis. These sensed parameters are represented quantitatively, and transduced by appropriate circuitry into electrical signals indicative of the parameter quantities. The signals may be used to control the performance of a musical composition (or the evolution of some other dynamic system), or may instead convey information. The signals may, for example, be provided to an interpreter that dynamically infers control commands from the gestures on a real-time basis in accordance with the generally accepted canon of musical conducting, directing the controlled system in accordance therewith. The invention may also sense one or more additional conducting parameters such as the speed and/or velocity, direction (i.e., trajectory) in three dimensions, absolute three-dimensional position, the "size" of a gesture in terms of the spatial distance between successive beats, and the "placement" of a beat pattern in space.

19 Claims, 4 Drawing Sheets

APPARATUS FOR CONTROLLING CONTINUOUS BEHAVIOR THROUGH HAND AND ARM GESTURES

FIELD OF THE INVENTION

The present invention relates to electronic control, and in particular to gestural control of systems capable of exhibiting continuous, dynamically changeable behavior.

BACKGROUND OF THE INVENTION

The increasing capacity of digital systems to model, emulate, process or synthesize rich, complex behaviors has engendered a corresponding need for control devices to mediate the dynamics of the behavior; the more complex the dynamics, the more numerous will be the degrees of freedom subject to control and, consequently, the less suited the system will be traditional computer control devices (such as a mouse or joystick). Unless the human user's physical "degrees of freedom" can be efficiently used to exert multidimensional control over the complex system degrees of freedom, effective and natural control will not be possible.

In a sense, this is the essence of musical conducting. Each musical instrument in an orchestra is a unique, complex system in its own right, having many degrees of freedom and capable of different behaviors depending on the style and skill of the musician. Orchestral performance of many instruments multiplies the dynamic possibilities dramatically. Conducting, which has been defined as "leading and coordinating a group of singers and/or instrumentalists in a musical performance or rehearsal" (Randel, The New Harvard Dictionary of Music), represents the use of a full range of human gesture to manipulate a highly complex system. The range of control afforded a conductor through gesture is vast compared with, for example, that obtainable with a mouse or a joystick, which are restricted to movement in two dimensions.

Efforts have been made to automate the process of conducting—or stated more broadly, to utilize gestural input for human-computer interaction—for many years. During the 1960s, for example, Mathews and Rosler developed a light-pen interface, which allowed users to trace their musical intentions on a screen and see its graphical result before actually processing it into a musical output. More recently, Mathews created a device called the "Radio Baton," which uses a coordinate system of radio receivers to determine its position. The array of receivers sends position values to a control computer, which, in turn, sends performance commands to a music computer (see http://ccrma-www.stanford.edu/CCRMA/Overview/).

A wand-shaped, wireless remote sensing device disclosed in 1983, designed as an input device for conducting, made use of ultrasonic (sonar) techniques to locate its position in space. The device was held so as to reflect ultrasonic signals back to a Polaroid ultrasonic rangefinder, which sensed the motion and modeled an image of the baton, and transmitted this information to a computer for analysis.

A complex "two-handed" conducting system, disclosed in 1991, utilized a camera viewer and charge-coupled device (i.e., a "CCD" video camera) to track right-handed motions of a baton and a "data glove" to sense left-hand gestures by measuring the position-coordinates of the fingers. See Morita et al., "A Computer Music System that Follows a Human Conductor," Computer Magazine (July 1991) at 44–53.

A system designed to measure gestural forces rather than positions or trajectories of feature points (as was done by Morita et al.) utilized a three-dimensional accelerometer (an inertial sensor that detects changes along three orthogonal coordinate axes). A software system extracted "kinetic parameters" and interpreted gestures. See Sawada et al., "Gesture Analysis Using 3D Acceleration for Music Control," Proc. Int'l. Comp. Music Conf. (1995) at 257–60.

Another accelerometer-based system consisted of a brass tube containing a simple handmade accelerometer, connected to a belt-pack unit with an AM transmitter and two switches ('stop/continue' and 'reset'). The belt-pack transmitted three channels of information (data from the acclerometer and switches) to an AM receiver. A microprocessor decoded this information, translated it into a MIDI-like code, and sent that code to command-sequencing software on a computer. See Keane et al., "The MIDI Baton II," Proc. Int'l. Comp. Music Conf. (1990) (supplemental pages).

All of these systems represent somewhat cumbersome efforts capable of modeling only a few of the most relevant gestural parameters available to a conductor. They burden the user with obstructive, distracting devices and accoutrements unfamiliar to conductors, while failing to provide him or her with the conductor's most familiar instrument—a baton that may be held and manipulated in the traditional fashion without encumbrance or fatigue.

DESCRIPTION OF THE INVENTION

Brief Summary of the Invention

The present invention utilizes various functional and design features to replicate the "feel" of a conducting baton and facilitate continuous sensing of the gestural parameters believed to be most critical to musical conducting. In one aspect, the invention comprises hand-held means for continuously sensing at least tempo and emphasis. By "tempo" is meant the time between "beats" (i.e., momentary pauses between oppositely directed accelerational spikes); and by "emphasis" is meant the magnitude of the accelerational force leading to and away from the beat. Emphasis may also encompass certain characteristic irregularities in the velocity, acceleration, orientation, and trajectory of the baton during this time. These sensed parameters are represented quantitatively, and transduced by appropriate circuitry into electrical signals indicative of the parameter quantities. The signals may be used to control the performance of a musical composition (or the evolution of some other dynamic system), or may instead convey information. The signals may, for example, be provided to an interpreter that dynamically infers control commands from the gestures on a real-time basis and directs the controlled system in accordance therewith.

The invention may also sense one or more additional conducting parameters such as the speed and/or velocity of the baton, its direction (i.e., trajectory) in three dimensions, the absolute three-dimensional position of the baton tracked as a continuous quantity, the "size" of a gesture in terms of the spatial distance between successive beats, and the "placement" of a beat pattern in space.

In a preferred embodiment, the invention utilizes an emitter-detector system to track a three-dimensional location, and an accelerometer array to enhance the accuracy of tracking. For example, the baton itself may contain a light-emitting diode (LED) whose output is tracked by a pair of detectors spatially opposed to (and generally facing) the user. This arrangement, it has been found, provides an accurate three-dimensional position with minimal computational burden. Alternatively, a three-dimensional position can be estimated using the output of the accelerometers and a single detector that is also capable of resolving the intensity of the LED signal.

In addition to positional information, the accelerometers furnish the acceleration information necessary to characterize beats, tempo and emphasis. The invention preferably also contains a series of touch sensors, located so as to be naturally accessible to the user's fingers, for measuring average pressure across the surfaces of the sensors. These measurements are relevant to the emphasis parameter and identification of beats, but may also provide an independent degree of freedom for control; for example, a stronger grip (as indicated by greater touch force) may be interpreted as calling for louder volume.

The baton is preferably wireless in nature, transmitting sensed data over discrete radio-frequency or other communication channels to a receiver, which interfaces to, for example, a computer for inferring gestural cues from the data and interpreting the gestural cues to perform the control function. Furthermore, unlike prior-art systems, the baton is preferably shaped for use in a manner natural to a conductor. In particular, the preferred construction of the present invention functions as an extension of the index finger—that is, aligned with the primary axis of the palm and index finger. This permits the full, unimpeded range of movement associated with conducting, seamlessly integrating pointing into free gesture. The body of the baton, which contains sensing and transmission circuitry, preferably has a symmetrical, tear-shaped (or oblate or elliptical) volume that permits the middle, ring and fifth fingers to wrap around the volume opposed to the thumb, and which can be comfortably held in hands of differing size. The touch sensors are arranged about the volume for natural alignment with the fingers.

This shape is natural for conductors used to gesturing with a baton, and through the use of microcircuitry can be made light enough for sustained use without fatigue. The electrical signals produced by the invention and representing sensed conducting parameters may be provided, for example, as inputs to a music computer. The music computer is configured to play back or synthesize a musical composition, and also for responsiveness to the conducting parameters. These are interpreted by the computer as gestural inputs, and used to vary the character and quality of the musical composition based on the well-recognized canon of conducting gestures.

It should be emphasized that the parameters sensed by the invention are not restricted to use as "conducting" gestures or in connection with musical performances. Instead, the gestural-sensing capabilities of the invention are properly viewed more broadly as furnishing the user with a repertoire of control functions that may be used to constrain the behavior of any dynamically changeable, observably sensible behavior. For example, the sensed gestures can be used as inputs to an evolving computer-generated (e.g., "virtual reality" or videogame) environment, the gestures being interpreted to control the action and evolution of the environment and its characteristics. The gestures can also have semantic or symbolic significance, in effect encoding communications, for transmission at relatively low bit rates.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
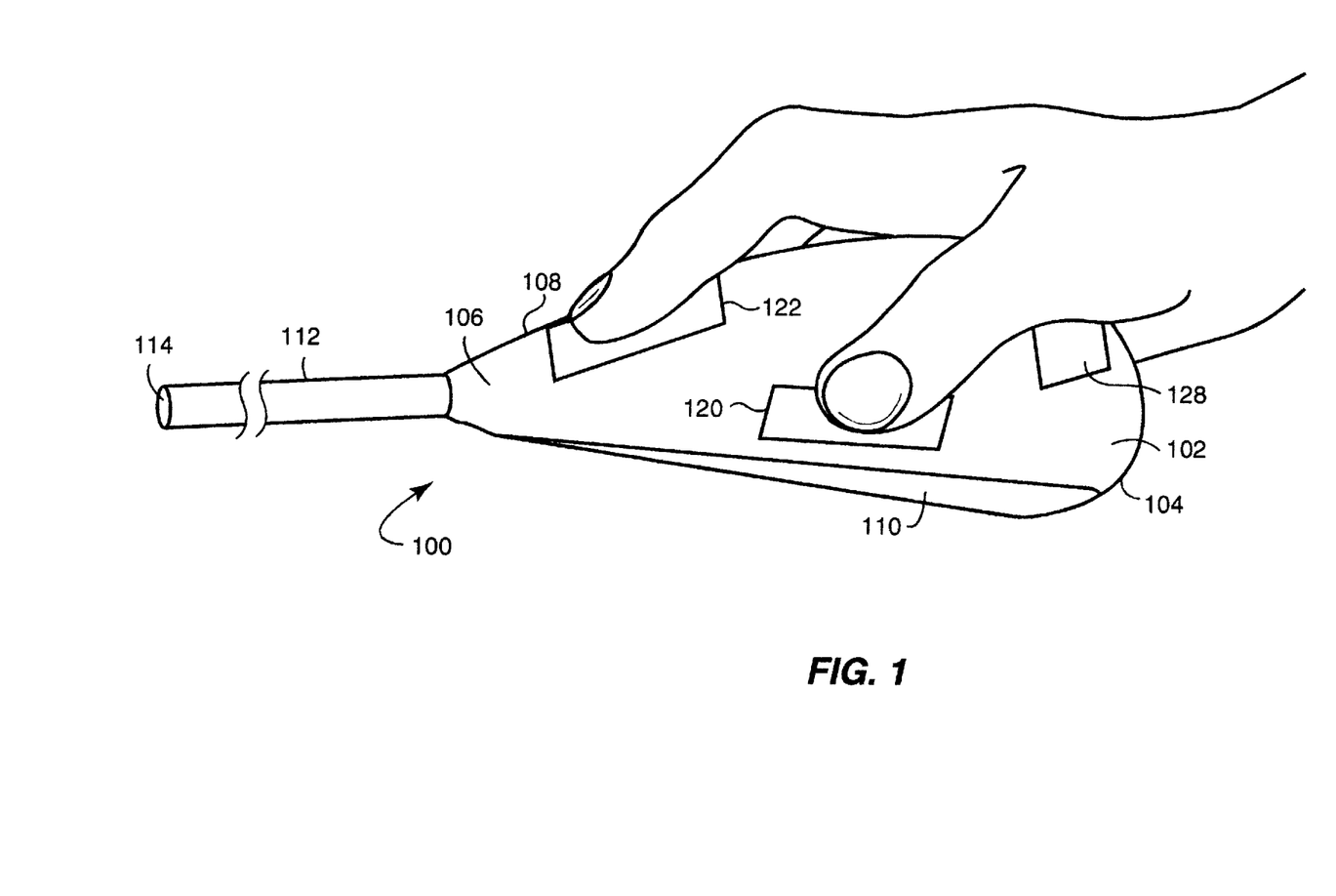
FIG. 1 is a side elevation of an apparatus for sensing hand and arm gestures in accordance with the invention.
Figure 2:
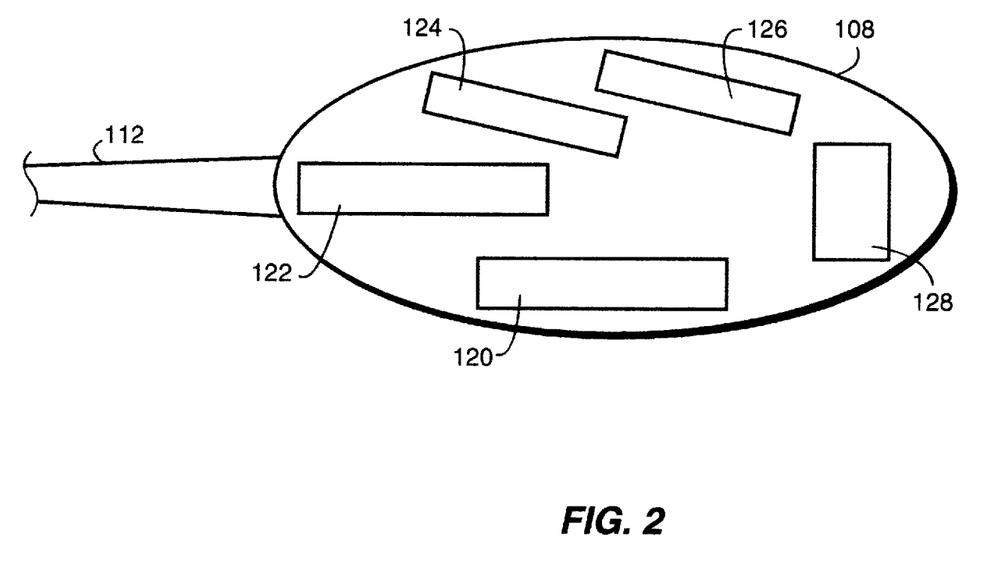
FIG. 2 is a plan view of the apparatus shown in FIG. 1, illustrated with a more elliptical shape.

FIGS. 1 and 2 illustrate a preferred physical embodiment of the hand-held baton aspect of the invention. The baton 100 includes a generally symmetrical, bulbous base or housing 102, having a rounded rear portion 104 that tapers into a narrow front portion 106. The upper region 108 is rounded in a contour adapted to be held comfortably in a cupped palm by hands of various sizes, without straps or other intrusive arrangements; the lower region 110 may be flat for convenient access to internal components and to limit overall weight. The base 102 is preferably hollow to accommodate the internal components described below, and formed of a material that is compressible—i.e., may be squeezed by the palm and fingers—but which does not deform. A preferred material is a two-part, unfoamed polyurethane composition; elastomeric materials can also be used. The surface of upper region 108 may be slightly dimpled to increase the surface friction and ease of gripping, but without irritation to the user.

A transparent rod 112, terminating in a front face 114, projects from the narrowed front 106; the length of rod 112 may be, for example, about 35 cm; as shown in FIG. 2, the rod may taper toward front face 114. A series of touch sensors 120, 122, 124, 126, 128 are arranged around the contour of of upper region 108. These may be molded within the thickness of base 102—i.e., located below the surface so as to be protected from damage, but close enough to the surface to be responsive to changes in pressure exerted by the user's fingers without significant loss of resolution.

Naturally, the shape of base 102 may be varied while retaining the primary ergonomic characteristics of hand-held comfort, convenient use, and natural finger placement. For example, base 102 may be more uniformly elliptical (as in FIG. 2) or oblate in nature, with rear and front portions 104, 106 rounded similarly. The most important feature of base 102 is a primary axis aligned with the user's palm, and a shape that permits convenient finger placement and differentiation. The baton 100 is held in place in a natural, pointing configuration that may be waved about while retaining a consistent finger placement and independent control over the touch sensors.

Touch sensors 120–128 are preferably force-sensitive resistive strips, measuring applied force with up to eight bits (i.e., 256 levels) of resolution. Approximately 1–2 inches long, the sensors are arranged, as shown in FIG. 2, for placement under the thumb, index, and middle fingers, the ring and fifth fingers combined, and the heel of the palm. They may be molded into the urethane matrix of the base 102, and wire leads pulled through to the interior of the base. If the sensors are located close enough to the surface of base 102, the loss of resolution is not significant. As an alternative, it is possible to utilize other force-sensitive materials, such as piezoelectric strips, for the touch sensors. Resistive strips are preferred, however, for their continuous force resolution and the ability to accurately measure total force over the entire surface of the strip at high frequency. In particular, commercially available force-sensitive resistive strips can update average pressure to eight bits of resolution every 3–5 msec (i.e., at frequencies of at least 200 Hz, which for purposes of the invention is effectively continuous).

Figure 3:
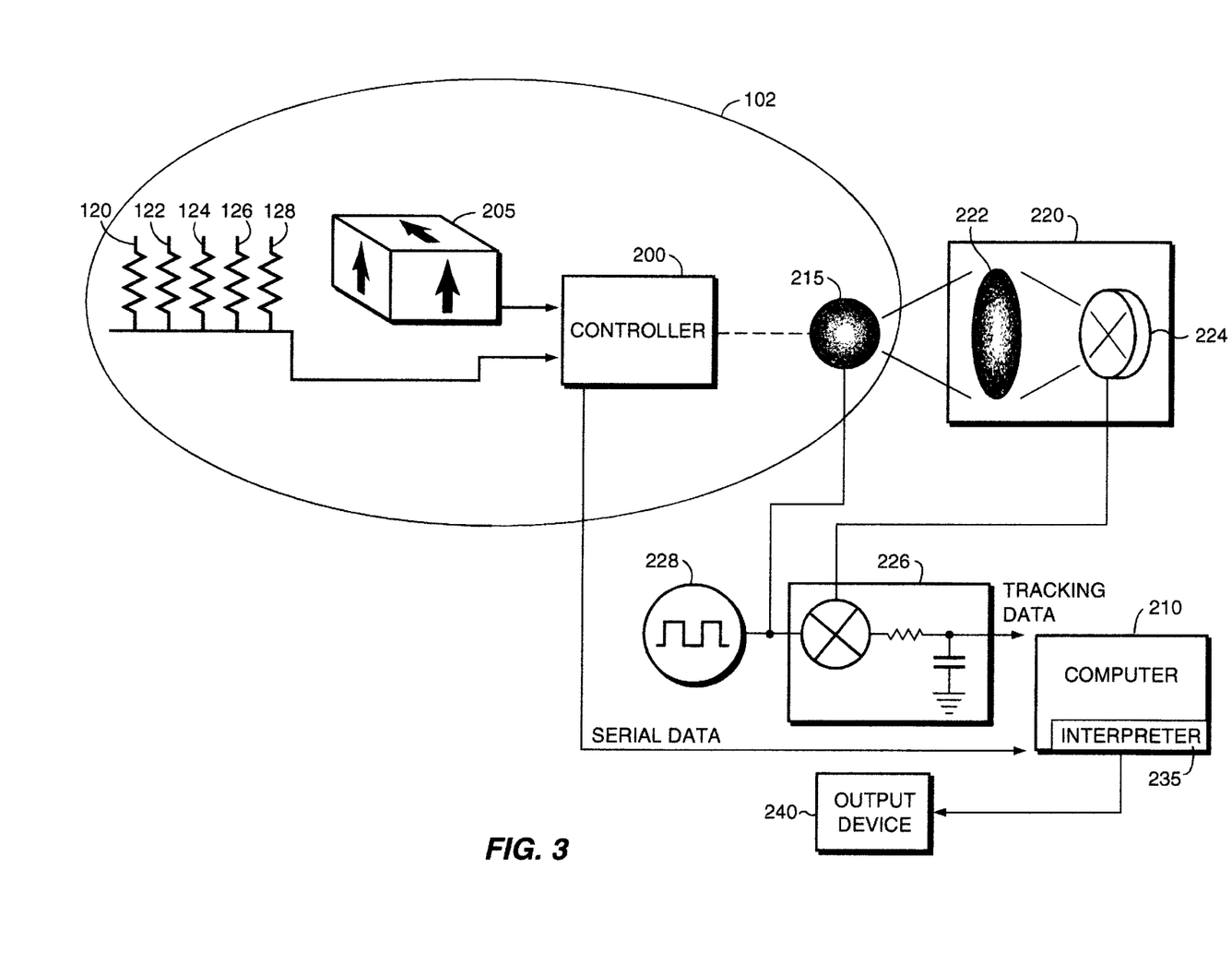
FIG. 3 schematically illustrates the operative components of the present invention and a representative hardware environment therefor.

Refer now to FIG. 3, which schematically illustrates the operative components of the invention and their interrelationship. Located in a cavity within base 102, and accessed through a port in lower region 110 (not shown), are a controller 200 having a self-contained power supply, and an accelerometer array 205. Controller 200 is wired to, and receives data from, touch sensors 120–128. Accelerometer array 205 contains three translational-motion inertial sensors, or accelerometers, arranged orthogonally. Each accelerometer is capable of measuring rates of change of velocity along a single axis; a suitable example is the ADXL05 unit sold by Analog Devices, which operates on the principle of differential capacitance: when an accelerational force is applied, an internal capacitive pendulum displaces and sends a signal containing the magnitude and direction of the acceleration.

The electrical signals produced by accelerometer array 205 can be used to derive three-dimensional information on changes in velocity, relative position, and to some extent orientation (if the baton is moved slowly, roll, pitch, and yaw can be measured from coupling of the gravity vector into acceleration along each axis, although if more precise or less movement-sensitive information is desired, the use of gyroscopes is preferred); accordingly, the accelerometers are used to identify beats and help characterize emphasis. Touch sensors 120–128 also help indicate emphasis (or, if desired, some other arbitrarily defined degree of freedom). Controller 200 accepts analog input from accelerometer array 205 and touch sensors 120–128, converts these into digital signals (by means of an internal analog-to-digital converter), and transmits the digital signals either over eight separate communication channels (which may be multiplexed) to a programmable digital computer 210 as serial data. Although the connection between controller 200 and computer 210 may be wired, it is preferred to utilize wireless means of transmission. In particular, controller 200 preferably contains appropriate multichannel transmission circuitry for wireless broadcast to complementary receiver circuitry in computer 210. All such circuitry is conventional in the art, and may be implemented in microchips.

Baton 100 also includes an LED 215, preferably radiating in the infrared spectral region, for indicating spatial position. Preferably, LED 215 is disposed on end face 114 (see FIG. 1), leads thereto passing through rod 112 to the interior of housing 102 for connection to power and control circuitry. Locating LED 215 at the end of rod 112 facilitates multidirectional radiation of the LED output, so that the output is not obscured or directionally limited by the baton itself during use. Alternatively, end face 114 can be hemispherical and polished, and LED 215 located within housing 102 such that its radiant output 215 travels through transparent rod 112 and is emitted through front face 114.

In either case, LED output is detected by a tracking system 220 that includes appropriate, conventional optical components (representatively indicated at 222) to focus the LED beam onto a position-sensitive photodiode (PSD) 224. The LED 215 effectively emits a point of light from front face 114, and PSD 224 detects the two-dimensional position of front face 114 and the intensity of light emitted therefrom. The position and intensity information, which, as described below, can be used to estimate the three-dimensional position of front face 114, are provided as a serial data stream by tracking system 220. In order to avoid interference by spurious ambient signals, a synchronous detector is preferably associated with both LED 215 and PSD 224. In particular, the output of LED 215 is modulated by an oscillator or wave generator 228 (which may have a frequency of, for example, 20 kHz), and the output of the oscillator 228 and PSD 224 are connected to the input terminals of synchronous detector 226. The data output of synchronous detector 226, which encodes the position and intensity information, is provided as serial data to computer 210.

Again, while the depicted schematic includes a wired connection to LED 215, this is easily replaced with a wireless arrangement. For example, controller 200 can include an onboard wave generator modulating the output of LED 215 (as indicated by the dotted line), and wave generator 228 configured as a variable-phase generator. By associating appropriate phase-lock loop circuitry with synchronous detector 226 and generator 228, the signal from PSD 224 may be brought into continuous phase with the modulated output of LED 215.

Computer 210 includes an interpreter module 235, which may be implemented as a series of machine-executable instructions, for converting the signals from touch sensors 120–128, accelerometer array 205, and tracking system 220 into control signals for driving an output device 240 (or, if the control signals are interpreted as information, for transmission). Output device 240 may be, for example, a music synthesizer, a controllable music playback device, a "virtual reality" system and display, or a videogame.

Interpreter 235 may have two stages. In a first stage, interpreter 235 derives levels for a series of parameterized quantities from the incoming data signals. These quantities correspond to various hand and arm gestures, and are typically stored in separate computer memory registers. In the preferred implementation, the parameters represent gestures critical to musical conducting, and include, at a minimum, tempo and emphasis. Additional parameters desirably quantified by interpreter 235 include position, direction, speed or velocity, size, and placement. In a second stage, interpreter 235 generates and issues control signals to output device 240 based on the parameter levels.

In a representative embodiment of the first stage, interpreter 235 quantifies the noted parameters (tempo, emphasis, position, direction, speed or velocity, size, and placement) from incoming data signals as follows. Tempo is found by measuring the time between successive beats (i.e., the interonset interval) and, based on this, determining the number of beats per unit time (generally 60 sec); that is, the interonset time is resolved in terms of seconds and 60 divided by this quantity to obtain beats/min. The tempo value may be constantly updated with each beat, or, preferably, defined on a time-averaged basis. Time averaging accounts both for the imprecision of human conducting gestures and for the fact that tempo usually remains roughly constant for at least a portion of a musical compositions. To update the tempo value for sudden changes in tempo, the value may be reset when beats are separated by a time substantially different from the current, averaged time.

Interpreter 235 detects the beats upon which tempo is based by recognizing moments of acceleration ≈0, just after a quick accelerational "spike" (i.e., an exponential increase in acceleration as detected by accelerometer array 205) in one direction and just before another accelerational spike in the inverse of that direction. The output of touch sensors 120–128 can also be used to identify the decisive handling of base 102 that typically accompanies execution of a beat.

The "emphasis" of the baton refers generally to the magnitude of the accelerational force leading to and away from the beat. However, in deriving an emphasis value, interpreter 235 may also take into account the amount of extra jiggling and shaking of the baton proximate to the beat, based on observed irregularities in the velocity, acceleration, orientation, and trajectory of baton 100. The output of touch sensors 120–128 can also be used to quantify emphasis.

The instantaneous two-dimensional position of the baton 100 (along the optical axes) is fully specified by the output of tracking system 220. Additional information concerning distance (i.e., position along the third dimensional axis) can also be derived, the quality of the distance information depending on the measures used to obtain it; some applications require relatively precise three-dimensional tracking, while for others, even imprecise estimates will suffice. High-quality three-dimensional positioning information can be obtained by using two spaced-apart tracking units 220. and. Less precise estimates of the distance from baton 100 to tracking system 220 can be computed from the sensed intensity of the LED signal; unfortunately, this quantity can be ambiguous, since intensity is also affected by baton orientation. However, by imposing constraints on the user's movements, it is possible to utilize accelerometer array 205 (or, for better accuracy, gyroscopes) to at least partially correct for the effect of orientation and obtain an estimate of distance based on the LED signal intensity. In this way, information describing optical-axis position, intensity, and three orthogonal accelerometer axes is combined to provide a three-axis (spatial) position estimate, e.g, using a state estimator or other tracking filter. While it is also possible to estimate three-dimensional position directly from the output of accelerometer array 205 (see, e.g., PCT application serial no. WO 95/21436, published on Aug. 10, 1995), the mathematics are computationally intensive and accelerometer drift generally much too large to permit frequently updated tracking.

The speed of the baton 100 is determined by differentiating its position (specified by signals from tracking system 220) or integrating acceleration over time. Although interpreter 235 can continuously and nearly instantaneously update the velocity parameter, for purposes of interpretation the velocity parameter may be updated less often; for example, the velocity parameter may be periodically updated at a default frequency, which can increase or decrease depending on changes in the velocity parameter itself. This damping effect is used to avoid "overinterpreting" small changes in the observed gestural patterns, which would result in issuing control signals unintended by the conductor.

Interpreter 235 determines the direction of baton 100 by taking the tangent to the curve of its position traced over a short period of time; the direction of the tangent can, of course, be three-dimensional since position is detected in three dimensions. The direction, combined with speed, provides a velocity vector, which can be useful for estimating progress or location within a beat pattern, and thereby predicting whether or not there will ensue a slowing down or speeding up of the tempo.

The "size" of a gesture represents the distance between successive beats in space, or more generally, the spatial extent or scaling factor of the overall beat pattern (e.g., the average spatial distance between beats). Accordingly, interpreter 235 quanifies this parameter by identifying three-dimensional positions associated with successive beats, computing distances therebetween and, as appropriate, averaging the distances over time.

The "placement" of a beat pattern refers to its general spatial locale, irrespective of its size. Interpreter 235 can be configured to identify placement by recording and updating the extreme points reached along each spatial axis as the baton 100 is used; however, once again in order to avoid overinterpretation of spurious or unusual gestures, the "extreme" points may in fact be time-averaged, or statistically large deviations from mean distances ignored.

The second stage of interpreter 235 uses these quantified gestural cues to formulate control signals according to an interpretive framework. In an exemplary embodiment, that framework is the canon of conducting gestures, and output device 240 is a synthesizer and/or playback device. Interpreter 235 issues control signals that cause device 240 to respond to the gestures in accordance with the interpretive framework, e.g., varying the musical output as the gestures would affect the performance of an orchestra.

The "grammar" of conducting gesture is well characterized, and this canon of gestures and elicited responses form the basis of the framework. The preferred implementation of the present invention utilizes tempo, emphasis, position, direction, speed (or velocity), size, and placement as parameters from which control signals are generated in accordance with generally accepted conducting principles. The tempo dictates the speed at which the musical composition is rendered, as well as its timing pattern, and is determined primarily from two-dimensional gesture, baton speed (or velocity), and the time between beats. For example, a conductor differentiates and indicates, by gesture (typically in two dimensions), musical measures having different numbers of beats. Measures consisting of one beat are indicated by an evenly accelerating downward stroke followed by a slight bounce at the moment of the beat, and then an upward stroke that follows the trajectory of the downward one. Similarly, a measure of two beats is indicated by an analogous downstroke, followed by a small curve off of the right, followed by an upward stroke with a slightly less exaggerated curve. These standard patterns are straightforwardly encoded, and interpreter 235 evaluates the trajectories and general evolution of the two-dimensional baton position returned by tracking system 220 against the encoded patterns for purposes of issuing appropriate musical control signals. Interpreter 235 may be programmed to detect indications of impending tempo increases or decreases (e.g., through analysis of baton speed and direction), as well as expressive variations in intensity or even in the beat patterns themselves, operating output device 240 to produce musically appropriate responses.

The third dimension of position returned by tracking system 220 may be interpreted to indicate overall loudness and timbral changes. For example, a conductor will often gesture closely to her or his body when indicating that something should be loud or heavy or forceful, and gesture away from her or his body to indicate that something should be soft or light or gently articulated. The size of a conducting gesture may also influence the loudness and expressive quality of a particular musical section.

Interpreter 235 may utilize the emphasis parameter to determine and control the forcefulness of the music—the amount of accent to be used, the kinds of bowings for the string sections to use, and the amount of expressive intensity the melodic line should take. Many music synthesizers are capable of differentiating these different aspects of musical performance in their outputs, and may therefore be controlled accordingly.

Interpreter 235 may analyze baton direction to detect upcoming changes in tempo, as well as the articulation of the music. Placement of a beat pattern low and close to the conductor generally indicates a clear, crisp quality; placement high and away from the conductor generally calls for a whispered, breathless effect.

Figure 4:
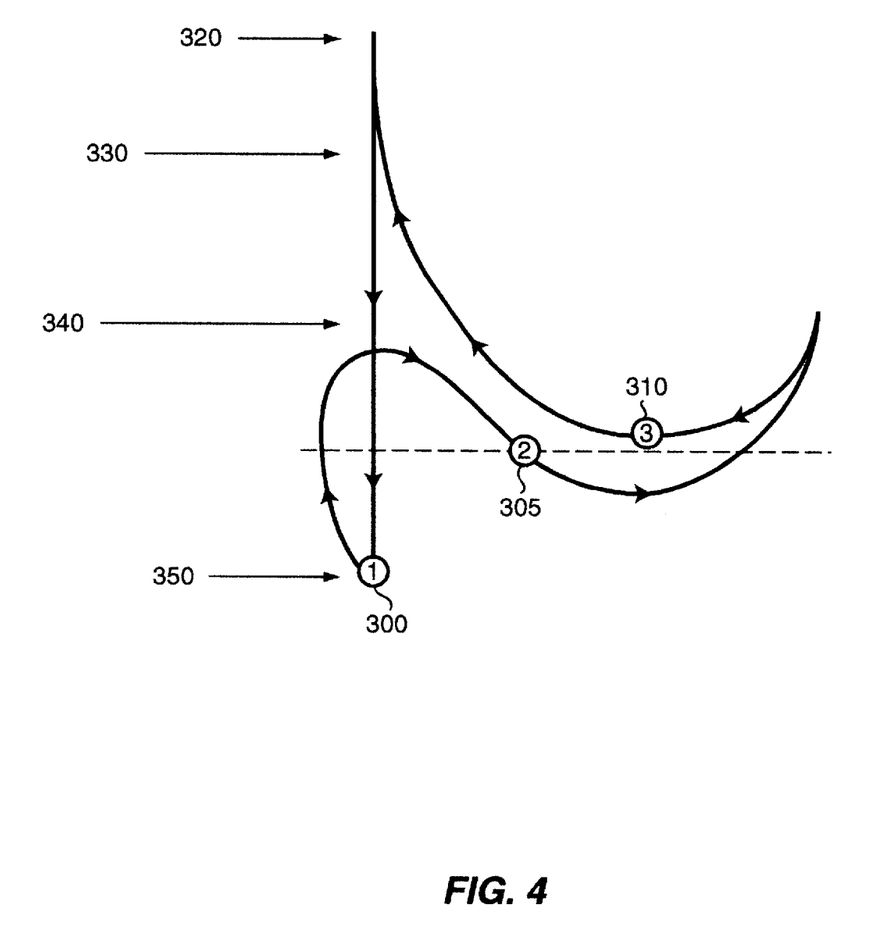
FIG. 4 diagrammatically illustrates a representative gestural pattern and its interpretation for purposes of control.

The operation of the various components of the invention may be better understood with reference to FIG. 4, which plots the trajectory of a representative conducting pattern: a three-beat expressive-legato. The occurrences of the first, second, and third beats are indicated at 300, 305, 310, respectively. At the beginning of the pattern, indicated at 320, the initially stationary baton begins to descend straight down, accelerating at an even rate through the region indicated at 330. As the baton enters the region near the bottom of the pattern, indicated at 340, its rate of acceleration increases (sometimes exponentially). At the very bottom of the pattern, at 350 (where first beat 300 occurs), the acceleration and velocity of the baton drop to zero, and it changes direction by almost −180° with a momentary acceleration in the new direction. While moving upward and slightly to the left, the velocity of the baton gradually decreases while the baton curves up to the vertical midpoint of the pattern, where the slope of its velocity vector equals zero. (This moment occurs approximately at the midpoint in time between first beat 300 and second beat 305.) Then the baton begins to move downward and to the right, slowly accelerating as the slope of its velocity vector increases from approximately −1 to 0. At the moment of second beat 305, the acceleration suddenly drops to zero, followed by a momentary acceleration in a direction approximately −90° from the acceleration prior to second beat 305. The baton then curves up and to the right, slowly decreasing in velocity until its velocity reaches zero at the very rightmost point in the pattern. (This moment occurs approximately at the midpoint in time between second beat 305 and third beat 310.) The baton then accelerates downwardly, approximating its previous curve at a rotation of about 5°. At the moment when the slope of the velocity vector is again equal to zero, the third beat 310 occurs. Finally, the baton travels upward at a 180° reflection from its trajectory at third beat 310, and returns to the initial starting point.

Tracking system 220 typically senses position every 3–5 msec; accordingly, even with a moderate tempo (approximately 80 beats per minute), 750 positional samples are taken between the very beginning and the very end of each beat. These positional samples can be plotted as a function of time to quantify both instantaneous and average velocity.

For purposes of the present invention, a beat may be more rigorously defined as a point of zero acceleration between generally opposed regions of changing acceleration. Accelerometer array 205 registers the rate of acceleration with a directional component along each axis, so that at the moment a beat occurs, array 205 detects an increase in the rate of acceleration, followed by zero acceleration, followed by a momentary increase in acceleration in the opposite direction. When integrated over time, this accelerational signal can be used to find the exact moment in time (to within about 3–5 msec) when a beat occurred. The user's hand may also squeeze the baton at the moment of a beat, so touch sensors 120–128 can provide a further indication of its occurrence.

With these operational capabilities, the invention is equipped, at a minimum, to identify a user's trajectory pattern as matching the expressive-legato pattern shown in FIG. 4; to sense the moments of beats 300, 305, 310; to time the pattern for purposes of identifying a tempo; and to issue control signals based on these functions. More significantly, however, the invention is capable of identifying finer points of the pattern's execution for interpretation by interpreter 235, so that the control signals ultimately generated are more sophisticated and capture greater gestural subtlety. That is, given a description of a beat pattern in terms of physical parameters (such as trajectory) and real-time knowledge of a baton's position and acceleration in space, it is possible to track the baton through the beat pattern to discern noticeable variations in execution by different conductors. For example, one conductor may start the beat pattern with a much slower initial velocity, and then accelerate at a much higher rate at the bottom of the downbeat; another conductor might begin with a high initial velocity and perhaps not accelerate very much at the bottom of the downbeat. Although they do not alter the basic beat pattern, these differences produce discernible consequences in orchestral performances; and because they can be sensed in terms of the physical parameters accessible to the invention, they can be modeled in interpreter 235 so as to be reflected in the control signals issued by the invention.

Expressive tempo variations, for example, are communicated in terms of "ritardando" (slowing down) and "accelerando" (speeding up). In order to communicate these, the conductor decreases or increases the velocity of the baton by a scaling factor proportional to the desired tempo. The conductor may also scale the distance between beats (longer for ritardando, shorter for accelerando), effectively making the size of the entire pattern larger or smaller. These changes in tempo and size are sensed by tracking system 220 and accelerometer array 205; interpreter 235, configured to sense and assign meaning to the changes, issues appropriate control signals implementing the interpreted meaning.

Metrical subdivisions are interpreted to give the music a more rhythmic quality; these are communicated by accentuating the temporal midpoint between each beat—either making the existing angle more acute, or by adding a small triangulation into the curvature of the trajectory. Accents on the beats (and sometimes their subdivisions) are interpreted to give the music a jagged or aggressive quality. These are communicated by making the angles of approach and release at each beat much more acute and also by increasing the rate of acceleration going into each beat. Legato phrasing is interpreted to give the music a more languid, peaceful quality. This is communicated by smoothing and rounding the trajectories of all the curves in the beat pattern, as well as by elongating all actions along the horizontal axis and foreshortening all actions along the vertical axis. Interpreter 235 is straightforwardly configured to detect and respond to all of these cases.

It will therefore be seen that the foregoing represents a conveniently used, highly versatile instrument for sensing and interpreting hand and arm gestures for purposes of system control, including control of musical performances. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for sensing hand and arm gestures, the apparatus comprising:

a. hand-held means for continuously sensing gestural parameters comprising (i) momentary pauses between oppositely directed accelerations, (ii) a tempo parameter specifying time between the pauses, and (iii) an emphasis parameter specifying a time-varying magnitude of accelerational force leading to and away from the pauses, the parameters each being expressed as a quantity;

b. means, disposed within the hand-held means, for transducing the sensed parameters into electrical signals indicative of the parameter quantities;

c. means for interpreting the signals; and d. means for communicating the signals from the transducing means to the interpreting means.

2. The apparatus of claim 1 further comprising means for tracking an instantaneous three-dimensional position of the hand-held means.

3. The apparatus of claim 1 further comprising means for tracking speed of the hand-held means.

4. The apparatus of claim 2 further comprising means for tracking velocity of the hand-held means.

5. The apparatus of claim 2 wherein the tracking means comprises (i) an emitter, associated with the hand-held means, for producing a radiant signal, and (ii) means spatially opposed to the hand-held means and responsive to the radiant signal for associating a position with the hand-held means.

6. The apparatus of claim 2 further comprising means for tracking an instantaneous three-dimensional direction of the hand-held means.

7. The apparatus of claim 1 wherein the tempo comprises a series of beats, and further comprising means for sensing a spatial distance between successive beats.

8. The apparatus of claim 1 wherein the tempo comprises a series of beats, and further comprising means for associating a spatial location with each beat.

9. The apparatus of claim 1 wherein the tempo-sensing means comprises means for sensing sudden changes in acceleration.

10. The apparatus of claim 1 further comprising means for sensing emphasis, said means comprising a plurality of touch sensors arranged for alignment with a user's fingers, each touch sensor having a surface and sensing average pressure across the surface.

11. Apparatus for sensing hand and arm gestures, the apparatus comprising:

a. hand-held means for continously sensing gestural parameters comprising (i) momentary pauses between oppositely directed accelerations, (ii) a tempo parameter specifying time between the pauses, and (iii) an emphasis parameter specifying a time-varying magnitude of accelerational force leading to and away from the pauses, the parameters each being expressed as a quantity, the hand-held means having a primary axis for alignmnent with a user's palm and comprising (i) a bulbous body configured to fit in a user's cupped palm and (ii) an elongated rod which, with the body in the user's cupped palm, projects beyond the body along the primary axis; and b. means for transducing the sensed parameters into electrical signals indicative of the parameter quantities.

12. The apparatus of claim 11 wherein the emphasis-sensing means comprises:

a. five touch sensors distributed around the body for alignment with a user's fingers, each touch sensor having a surface and sensing average pressure across the surface; and b. means for transducing the sensed averaged pressures into electrical signals indicative thereof.

13. The apparatus of claim 11 further comprising, within the body, tracking means comprising an emitter for producing a radiant signal through the rod, the radiant signal being detectable at locations spatially opposed to the hand-held means.

14. The apparatus of claim 13 wherein the emphasis-sensing means comprises:

a. five touch sensors distributed around the body for alignment with a user's fingers, each touch sensor having a surface and sensing average pressure across the surface; and b. means for transducing the sensed averaged pressures into electrical signals indicative thereof, the apparatus further comprising c. means for transmitting the position and pressure signals.

15. The apparatus of claim 14 wherein the transmitting means comprises a wireless transmitter having a separate communication channel for each position and pressure signal.

16. The apparatus of claim 11 wherein the body comprises a compressible, nondeformable housing.

17. The apparatus of claim 1 wherein the interpreting means processes the parameter signals into control signals.

18. Apparatus for controlling, based on sensed hand and arm gestures, at least one source of dynamically changeable, observably sensible behavior, the apparatus comprising:

a. hand-held means for continuously sensing gestural parameters comprising (i) momentary pauses between oppositely directed accelerations, (ii) a tempo parameter specifying time between the pauses, and (iii) an emphasis parameter specifying a time-varying magnitude of accelerational force leading to and away from the pauses, the at parameters each being expressed as a quantity, the hand-held means having a primary axis in alignment with a user's palm;

b. means for transducing the at least one sensed parameter into electrical signals indicative of the quantity;

c. an interpreter, operatively associated with the transducing means and the behavior source but physically unconnected to the transducing means, for processing the parameter signals into control signals for controlling the behavior source in accordance with the at least one sensed parameter; and d. means for wirelessly transmitting the parameter signals from the transducing means to the interpreter.

19. The apparatus of claim 18 wherein the behavior source comprises means for performing a musical composition.

* * * * *